(12) United States Patent
Watler et al.

(10) Patent No.: US 7,844,907 B2
(45) Date of Patent: Nov. 30, 2010

(54) SYSTEM AND METHOD FOR DYNAMIC MODIFICATION OF WEB CONTENT

(76) Inventors: William Watler, 31391 Loges La., Evergreen, CO (US) 80439; Jonathan Phillips, 27456 Upper Cold Springs Gulch, Golden, CO (US) 80401; David Young, 1755 Sunset Blvd., Boulder, CO (US) 80304

( * ) Notice: Subject to any disclaimer, the term of this patent is extended or adjusted under 35 U.S.C. 154(b) by 1464 days.

(21) Appl. No.: 10/272,373

(22) Filed: Oct. 16, 2002

(65) Prior Publication Data

US 2004/0075686 A1 Apr. 22, 2004

(51) Int. Cl.
*G06F 3/00* (2006.01)
(52) U.S. Cl. ............. 715/762; 715/744; 715/760; 715/735; 715/765; 715/808; 715/790
(58) Field of Classification Search ........... 345/744, 345/735, 760, 762, 763, 764, 765, 808; 715/744, 715/735, 760, 762, 763, 764, 765, 808, 790
See application file for complete search history.

(56) References Cited

U.S. PATENT DOCUMENTS

| | | | |
|---|---|---|---|
| 5,630,025 A | 5/1997 | Dolby et al. | |
| 5,877,966 A | 3/1999 | Morris et al. | |
| 5,945,989 A * | 8/1999 | Freishtat et al. | 345/760 |
| 6,427,063 B1 | 7/2002 | Cook et al. | |
| 2002/0109729 A1 * | 8/2002 | Dutta | 345/790 |
| 2002/0145628 A1 | 10/2002 | Burgin et al. | |
| 2003/0112274 A1 * | 6/2003 | Gao et al. | 345/760 |

FOREIGN PATENT DOCUMENTS

| | | |
|---|---|---|
| EP | 0 829 996 A2 | 3/1998 |
| WO | WO97/44767 | 11/1997 |
| WO | WO98/32107 | 7/1998 |
| WO | WO 99/01826 | 1/1999 |
| WO | WO 00/29977 | 5/2000 |
| WO | WO 02/082323 | 10/2002 |
| WO | WO 2004/036358 | 4/2004 |

OTHER PUBLICATIONS

Poleretzky Z et al: "The Call Center & e-Commerce Convergence" Dialog ABI/Inform(R), XP002949410 2001.
Attardi G et al: "Web-based Configuration Assistants" Artificial Intelligence for Engineering Design, Analysis and Manufacturing, London, GB, vol. 12, No. 4, Sep. 1998 pp. 321-331, XP002902516.

(Continued)

*Primary Examiner*—Weilun Lo
*Assistant Examiner*—Mylinh Tran
(74) *Attorney, Agent, or Firm*—Frost Brown Todd LLC; William S. Morriss

(57) ABSTRACT

A system and method for dynamic modification and generation of data. One embodiment includes an annotation server that is connected to a user and a content provider. The annotation server is configured to modify a copy of an enterprise's stored Web content without necessarily modifying the actual stored Web content. The annotation server then provides the modified content to the user for viewing or other use.

4 Claims, 8 Drawing Sheets

OTHER PUBLICATIONS

Information Disclosure Statement for U.S. Appl. No. 09/944,836, (Nov. 9, 2001).
Information Disclosure Statement for U.S. Appl. No. 09/944,836, (Apr. 23, 2002).
Information Disclosure Statement for U.S. Appl. No. 09/944,836. (Oct. 23, 2002).
Information Disclosure Statement for U.S. Appl. No. 09/944,836, (Oct. 29, 2002).
Information Disclosure Statement for U.S. Appl. No. 09/944,836, (Aug. 15, 2003).
Office Action for U.S. Appl. No. 09/944,836, (Jan. 4, 2005).
Office Action for U.S. Appl. No. 09/944,836, (Jul. 21, 2005).
Information Disclosure Statement for U.S. Appl. No. 09/944,836, (Oct. 24, 2005).
Information Disclosure Statement for U.S. Appl. No. 09/944,836, (Dec. 8, 2005).
Office Action for U.S. Appl. No. 09/944,836, (Dec. 15, 2005).
Information Disclosure Statement for U.S. Appl. No. 09/944,836, (Mar. 17, 2006).
Office Action Final Rejection for U.S. Appl. No. 09/944,836, (Aug. 21, 2006).
Meet Lightspan—"Expanding the Learning Environment"; http://www.lightspan.com/cgi-bin/ac; pp. 1-4; Apr. 18, 1996.
Wendell Lansford, "Real-time interactive sales and services across the Internet: Optimizing the customer experience", Call Center Solutions vol. 17 No. 5, pp. 54-59, Nov. 1998.
Office Action dated Apr. 17, 2009 for U.S. Appl. No. 09/944,676.

* cited by examiner

135

SYSTEM AND METHOD FOR DYNAMIC MODIFICATION OF WEB CONTENT

RELATED APPLICATIONS

The present application is related to commonly owned and assigned application nos:

Ser. No. 08/651,422, entitled AGENT BASED INSTRUCTION SYSTEM AND METHOD, filed May 22, 1996;
Ser. No. 09/042,528, entitled AGENT BASED INSTRUCTION SYSTEM AND METHOD, filed Mar. 15, 1998;
Ser. No. 09/424,353 entitled AGENT BASED INSTRUCTION SYSTEM AND METHOD, filed Nov. 22, 1999;
Ser. No. 09/518,916, entitled SYSTEM AND METHOD FOR OPTIMIZING A PRODUCT CONFIGURATION, filed Mar. 3, 2000;
Ser. No. 09/669,251, entitled E-COMMERCE SALES SUPPORT SYSTEM USING A VENDOR-SPECIFIC PRODUCT DECISION QUESTIONNAIRE, filed Sep. 25, 2000;
Ser. No. 09/945,032, entitled SYSTEM AND METHOD FOR ENABLING COMMUNICATION BETWEEN BROWSER FRAMES, filed Aug. 31, 2001;
Ser. No. 09/944,676, entitled SYSTEM AND METHOD FOR AUTOMATED END-USER SUPPORT, filed Aug. 2001; and
Ser. No. 09/944,836, entitled SYSTEM AND METHOD FOR AUTOMATED END-USER SUPPORT, filed Aug. 31, 2001;

all of which are incorporated herein by reference.

FIELD OF THE INVENTION

The present invention relates to dynamic modification and generation of data. In particular, but not by way of limitation, the present invention relates to systems and methods for dynamically modifying and generating markup-language code and other web-presentation content.

BACKGROUND OF THE INVENTION

As the role of the Internet grows in business, enterprises are investing significant resources in developing intuitive, informative and easy-to-use Web-sites. In fact, sophisticated Web-sites are critical to the business model of many enterprises—whether those enterprises are traditional brick-and-mortar retailers, e-commerce retailers, vendors, or suppliers. These sophisticated Web-sites are difficult to build and equally as difficult to maintain. Because of these difficulties, enterprises are understandably protective of their Web-site content and are reluctant to integrate new functionality or implement desired changes.

Sophisticated Web-sites need the ability to efficiently modify their content, monitor a user's browsing activities, and/or control the user's navigation through the Web-site. These functions, for the most part, can be integrated directly into an enterprise's Web-site code. (The enterprise's Web-site code is referred to as "stored Web content," and can include content, presentation instructions, embedded code, operational code, and/or any combination of the above.) When an e-commerce retailer, for example, wants to add an "On Sale" icon next to a particular product, the retailer usually adds code for the icon directly into its stored Web content. Of course, when the retailer wants to remove the icon, the corresponding code should be removed from the retailer's stored Web content. Similarly, when an enterprise wants to monitor and control the navigation of a user within its Web-site, code such as JavaScript is generally directly integrated into the stored Web content.

Modifying stored Web content, whether it be to add text and images or to add functionality such as monitoring and navigation control, is burdensome. Additionally, staff and financial limitations restrict an enterprise's ability to modify its stored Web content. In particular, in-house technology staffs are often not equipped or do not have time to add sophisticated functionality to an enterprise's Web-site. Thus, if these sophisticated functionalities are not readily available from third-party vendors, they are generally not implemented. Unfortunately, enterprises are understandably reluctant to allow third-party vendors to integrate functionality into their stored Web content because of the risk of increased downtime for their Web-site.

Because of the staff and financial limitations and the desire to protect the integrity of their stored Web content, enterprises generally prefer to implement certain functionality with only a minimal amount of changes to their stored Web content. In other words, enterprises would prefer to separate certain functionalities from their stored Web content. Present technology and Web-site security requirements, however, force enterprises to integrate much functionality directly into their stored Web content. Accordingly, enterprises often forego integrating needed functionality into their Web-sites.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention, in one embodiment, includes a system and method for separating content, control, editing and/or monitoring functions in a Web environment. Other embodiments are directed at non-Web environments such as graphical user interfaces (GUIs), image rendering systems, text rendering systems, non-Web HTML rendering systems, and non-Web XML rendering systems.

In one embodiment, the described invention includes an annotation server that is connected to a user (operating a browser such as Microsoft's Internet Explorer) and a content provider, which is often an enterprise's Web server and associated content. The annotation server is configured to modify a copy of an enterprise's stored Web content without necessarily modifying the actual stored Web content. For clarity, the copy of the stored Web content that is provided to the annotation server is referred to as "original content." The annotation server, thus, receives and modifies "original content." Once the original content has been modified, it is referred to as "modified content." The annotation server generally provides the modified content to the user—although the modified content can be routed back to the Web server and then to the user.

The annotation server can intercept or monitor communications between the content provider and the user, thereby enabling one embodiment of the annotation server to perform content modification, event monitoring, session state management, and navigation control. Notably, the annotation server can implement one or all of these functions on the fly with little or no modification to the stored Web content.

Referring first to the annotation server's content modification functionality, it allows original content served up from the content provider to be modified and edited without otherwise changing the stored Web content. For example, the annotation server can intercept the original content bound for the user, identify any embedded links in the original content, and replace those links with new or modified links such that the original links can be redirected to point to alternative locations. In this embodiment, the links are replaced or modified without altering the stored Web content.

In another embodiment of the annotation server, it can insert text and images into the original content and/or edit existing text and images in the original content. For example, the annotation server can insert a "SALE" icon into the original content next to a particular product. The modified content, including the inserted "SALE" icon, could then be transmitted from the annotation server to the user such that the icon would be displayed next to the relevant product. As previously described, inserting an icon into a Web page generally requires the corresponding stored Web content to be modified. That is, the code for the icon would be inserted into the stored Web content. Using the annotation server, however, the modification is performed dynamically on a copy of that stored data, i.e., the original content, and the stored Web content is not necessarily modified.

The annotation server can also include an event monitoring functionality that can be implemented without significant modification of the stored Web content. In one embodiment, the annotation server can monitor a user's navigation of a Web-site. For example, when a user selects an embedded link that points to the content provider, the annotation server can intercept the selection of the link, modify the link if necessary, and then pass the link or some representation thereof to the content provider. By intercepting the link, the annotation server can remain aware of the current content being viewed by the user. This location awareness is useful for online help and customer support functions that need to know what the user is viewing.

In another event-monitoring embodiment, the annotation server could monitor and validate data entered into a Web-based form with little or no interaction with the content provider. Essentially, this implementation of the annotation server isolates parts of the form-validation function from the content provider, thereby allowing the content provider to build a less complex Web-site. Consider the case of making an airline reservation online. The annotation server could detect the user's entry into the destination field, and before the entry was submitted to the airline's Web server, the annotation server could verify that the destination entered by the user is proper. If the destination is not proper, the annotation server could dynamically modify the displayed Web page to indicate the error. For example, the annotation server could insert a text bubble informing the user of the error and how to remedy it. Because the annotation server monitors the user's entries and validates them on the fly, interaction with the airline's Web server is not necessarily required.

In another embodiment, the annotation server detects a "form submit" executed by the user. Generally, when a user chooses to submit a form, the user's browser submits the form directly to the content provider. In this embodiment, however, the browser submits the form to the annotation server instead of the content provider. The annotation server then verifies the entries in the form against data previously provided by the content provider. If the entries in the form are correct, the form is submitted to the content provider. If the entries in the form are not correct, the annotation server identifies the incorrect entries, generates an appropriate error message, and dynamically inserts the error message into the page that the user is viewing. The incorrect entries are not necessarily submitted to the content provider.

The annotation server can also include navigation control functions that can be independent of or integrated with the other annotation server functionalities. In one embodiment, the annotation server has the ability to automatically navigate a content provider's Web-site. For example, the annotation server could automatically identify and select a link to an alternate page within the Web-site. In other embodiments, the annotation server could embed anchors into a Web page and subsequently scroll the page to a particular anchor. For example, the annotation server could scroll a page to the relevant material that answers a user's questions rather than force the user to locate and scroll the page manually.

As previously stated, the above-described embodiments and implementations are for illustration purposes only. The principles of the present invention can be used in non-Web-based environments. These and numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
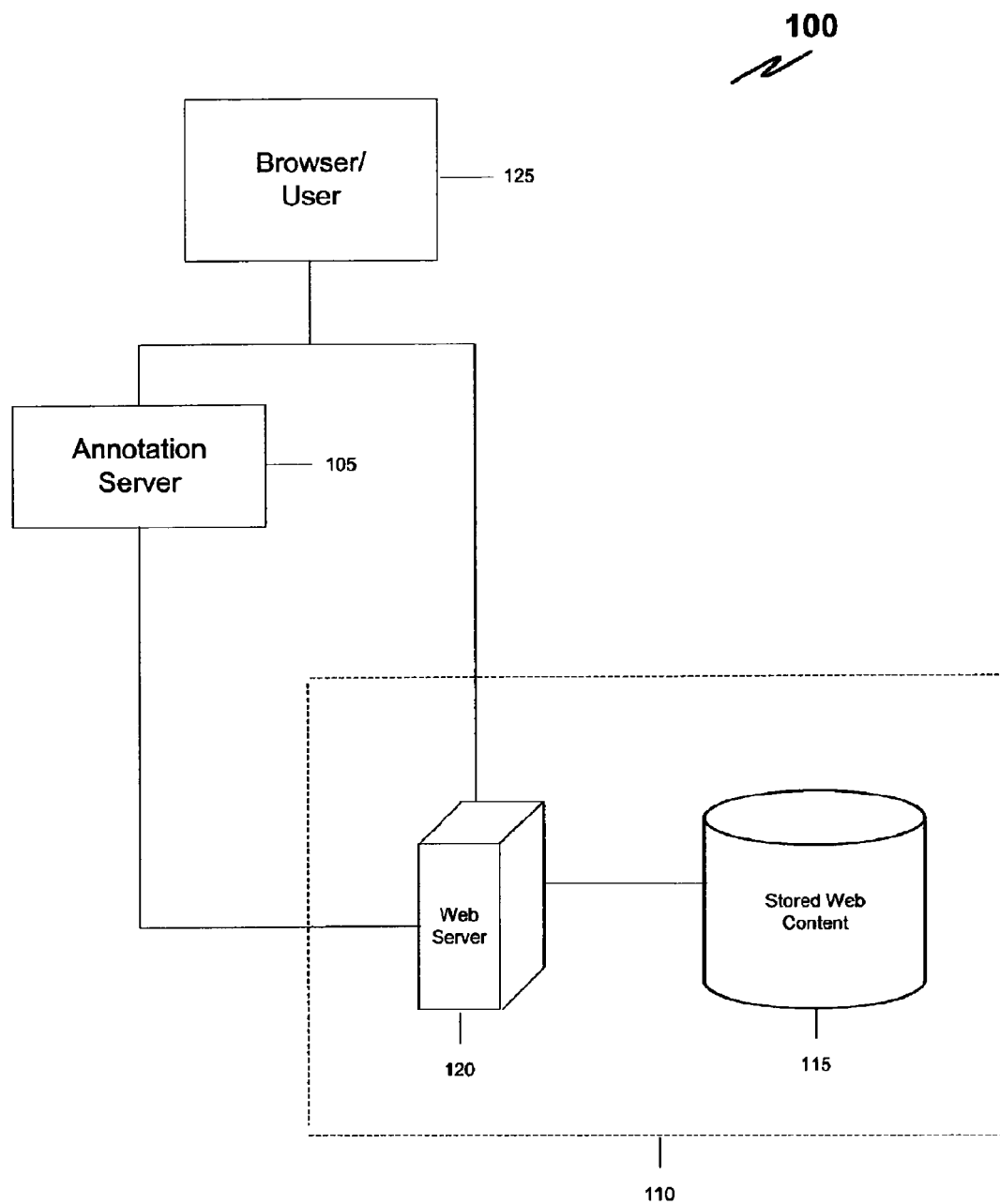
FIG. 1 is a block diagram of a system constructed in accordance with the principles of the present invention.

Referring now to the drawings, where like or similar elements are designated with identical reference numerals throughout the several views, and referring in particular to FIG. 1, it illustrates a block diagram of a system 100 constructed in accordance with the principles of the present invention. This embodiment includes an annotation server 105, a content provider 110—consisting of stored Web content 115 and a Web server 120—and a Web browser 125 (also referred to as the "user"). Each of these components can be attached to the same network, such as the Internet, or attached to different networks such as LANs, WANs, etc. Additionally, this embodiment includes separate paths from the content provider 110 to the user 125—a path that goes through the annotation server 105 and a path that directly connects the content provider 110 with the user 125. The hardware and software components of servers, networks and storage devices are well known in the arts and are not described further. Similarly, the hardware and software components of the annotation server 105 as described are recognizable by those of skill in the art. For example, the annotation server 105 could include basic server hardware and software, intermediate language engines, a Linux or Microsoft operating system, etc.

The annotation server 105 is arranged so that it can conditionally intercept communications otherwise directed from the content provider 110 to the user 125 and dynamically alter, monitor and control the content being served to the user. "Intercepting" includes, but is not limited to, directing the content provider 110 to route content bound for the user 125 to the annotation server 105 instead of the user 125. For example, "intercepting" could include the annotation server 105 directing the user 125 to return data for the annotation server's IP address instead of the Web server's IP address.

The annotation server 105 can also conditionally intercept communications from the user 125 to the content provider 110. In one embodiment, the annotation server 105 modifies the embedded links in the original content received from the content provider 110 such that the embedded links point to the annotation server 105 instead of the content provider 110. For example, the original Web page could be located at "www.buy.com" and an embedded link could refer to "www.buy.com/computers." The annotation server 105 could modify this link so that it points to "www.annotation_server.com/buy/computers." When the user 125 selects what appears to be the "www.buy.com/computers" link, the user 125 is actually routed to "www.annotation_server.com/buy/computers." Thus, the annotation server 105 has "intercepted" the communication between the user 125 and the content provider 110. This process is described in more detail herein.

Figure 2:
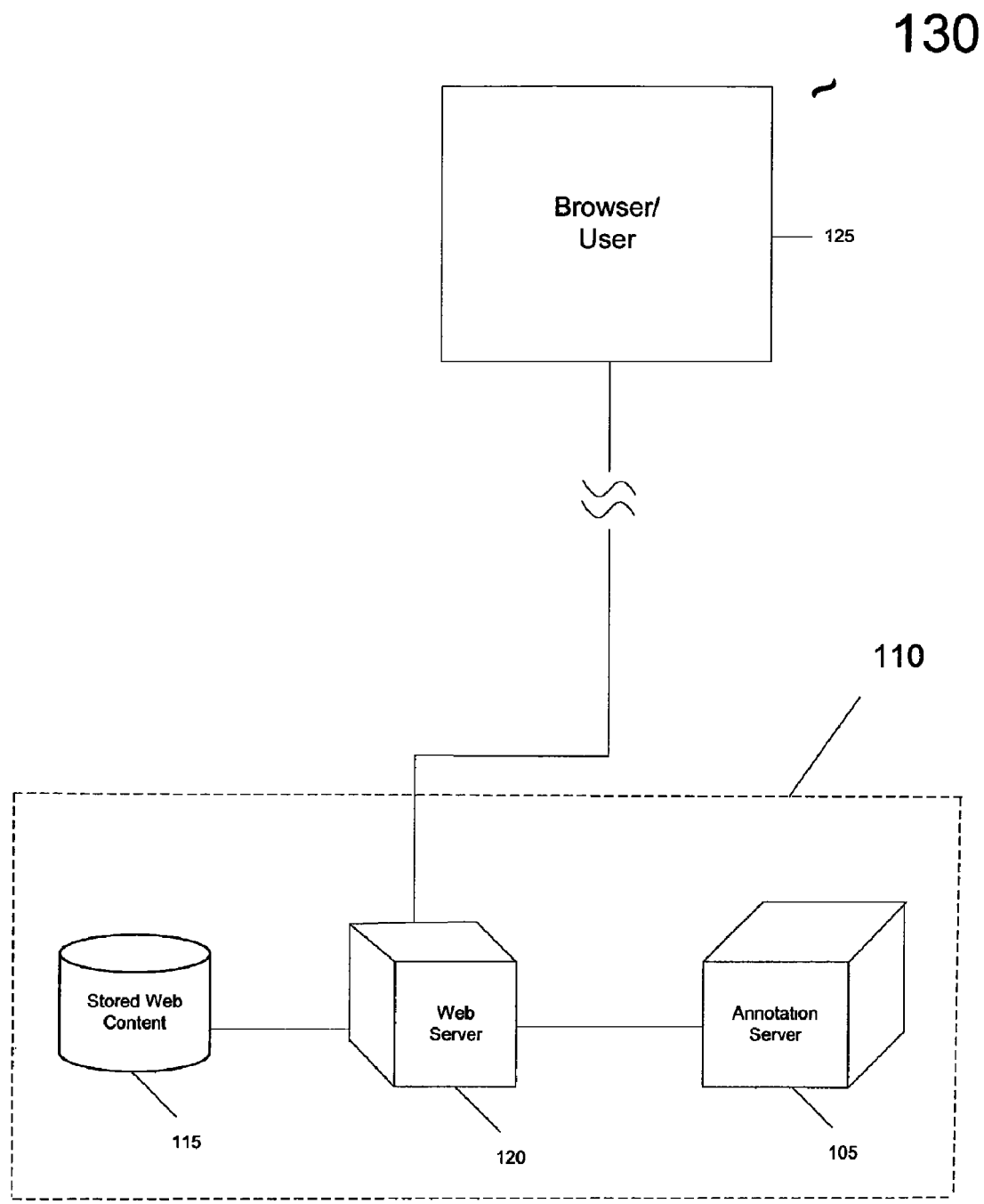
FIG. 2 is a block diagram of an alternate system constructed in accordance with the principles of the present invention.

Referring now to FIG. 2, it is a block diagram of an alternate system 130 constructed in accordance with the principles of the present invention. In this embodiment, the annotation server 105 is integrated with the content provider 110. Instead of operating as a separate system, the annotation server 105, in this embodiment, is integrated with the content provider 110. As with the embodiment shown in FIG. 1, the annotation server 105 can modify, monitor and control the content being served to the user 125 with minimal disturbance to the content provider's stored Web content 115. Otherwise, the operation of this embodiment is similar to the operation of the system 100 shown in FIG. 1.

Original Content Editing and Modification

Figure 4:
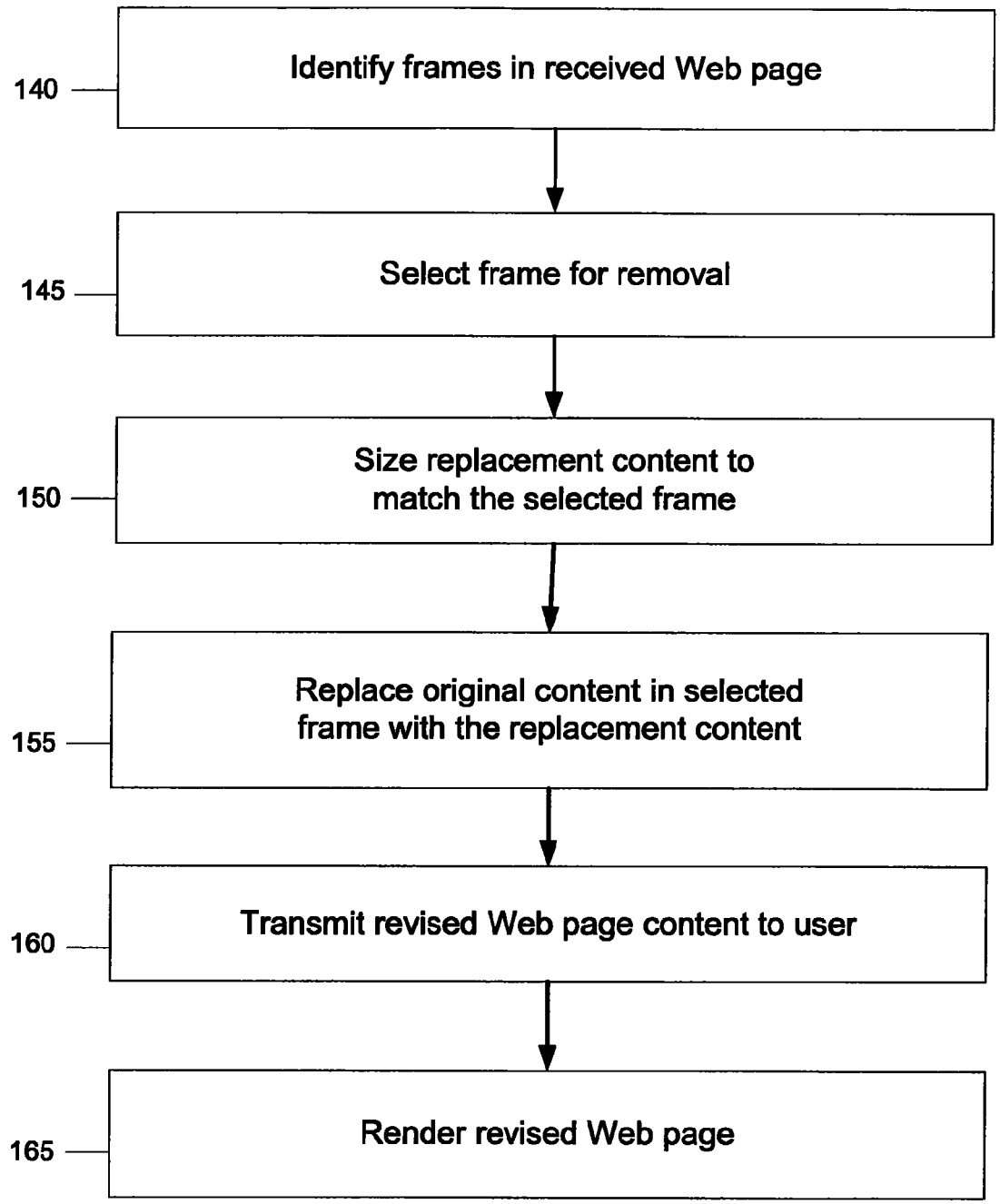
FIG. 4 is a flowchart of one method for replacing content in a multi-frame Web page.
Figure 5:
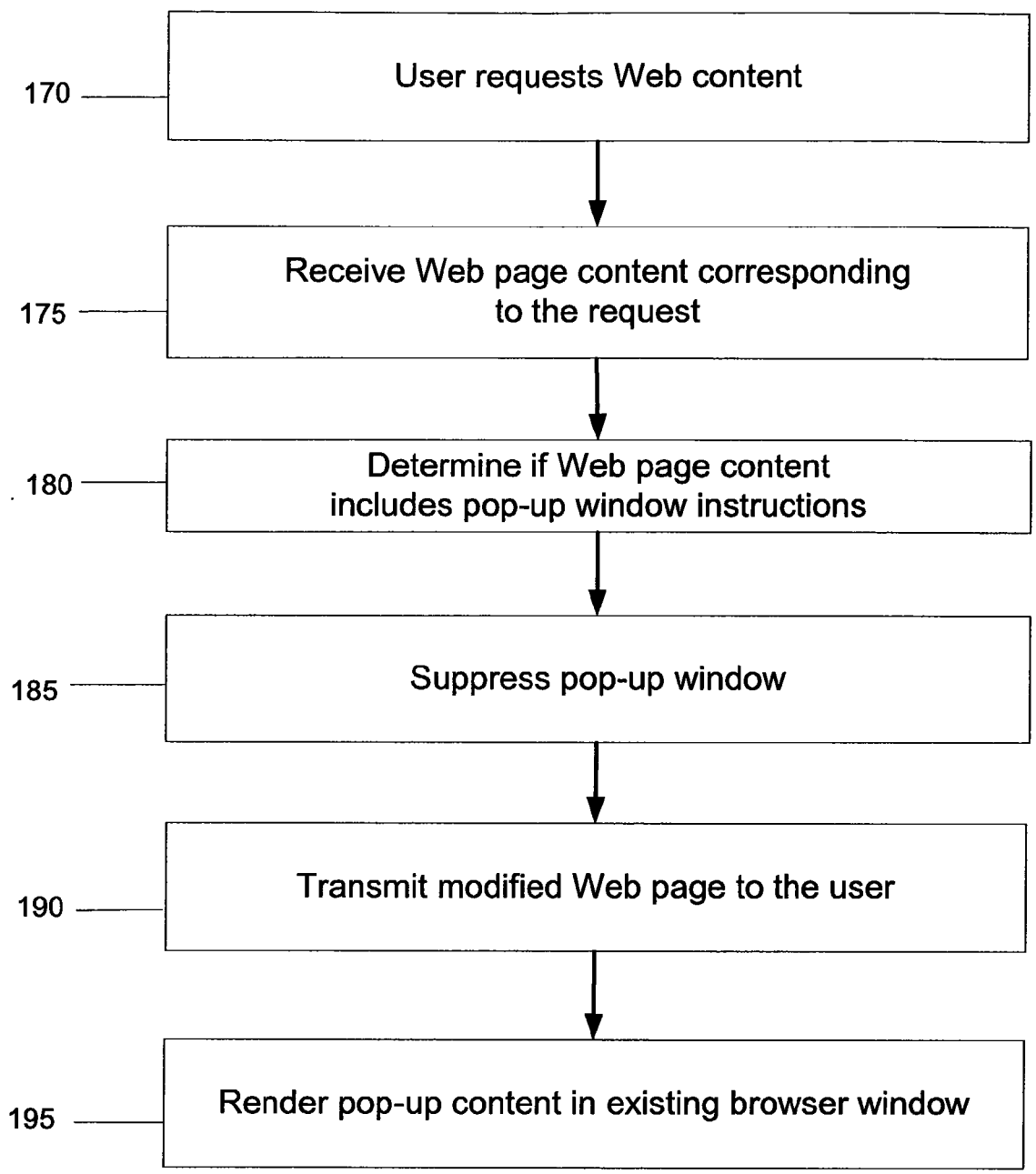
FIG. 5 is a flowchart of one method for controlling pop-up displays in a Web environment.
Figure 6:
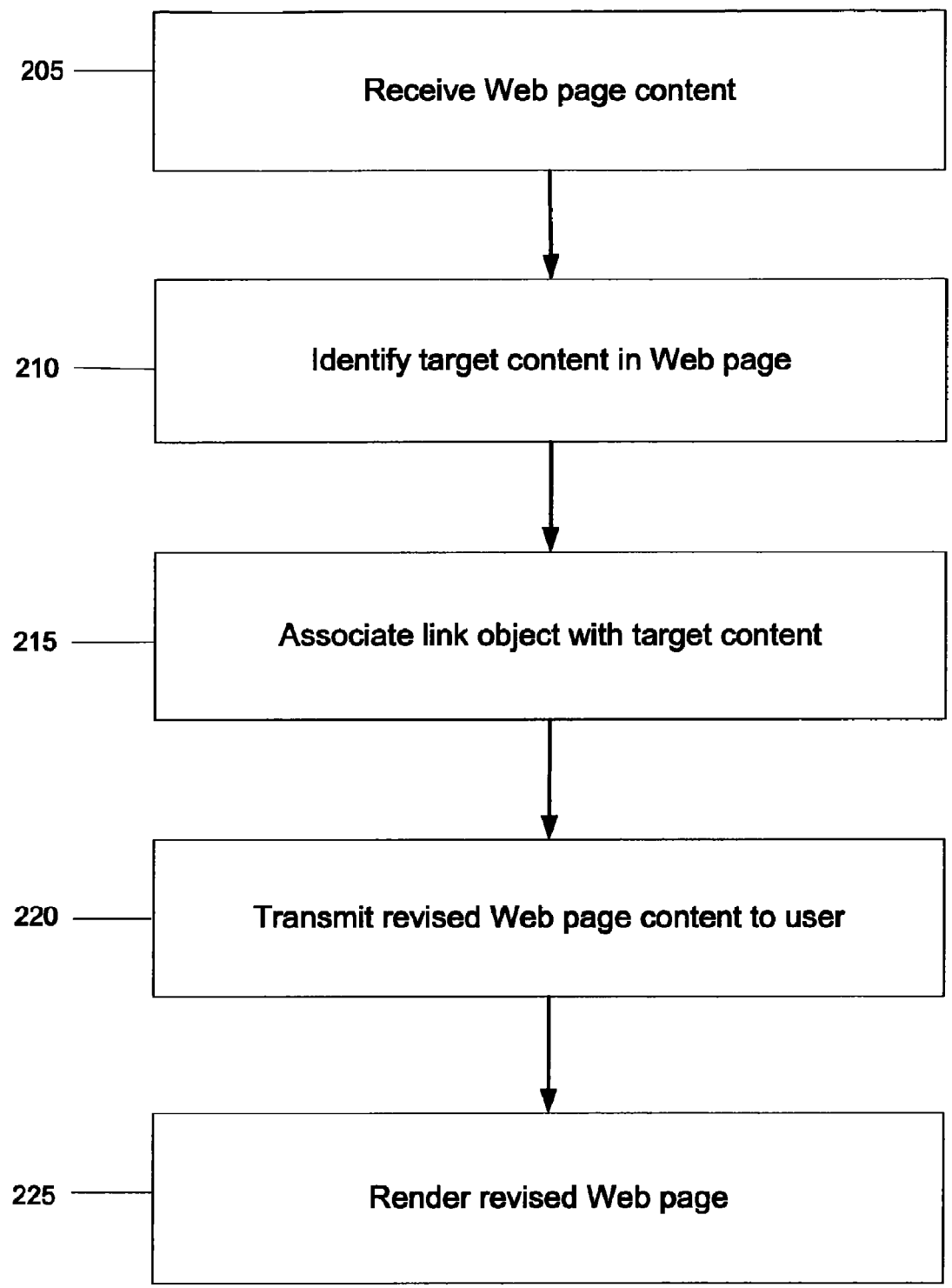
FIG. 6 is a flowchart of one method for inserting links into a Web page.

FIGS. 4-6 illustrate exemplary embodiments for modifying original content, such as XML, HTML, Flash, etc., served up by a content provider 110 without substantially changing the stored Web content 115. The exemplary methods illustrated in these figures enable content providers 115 to outsource certain editing and modification functions or to integrate annotation server 105 technology into their own system to make temporary or conditional editing and modification less burdensome. The methods can be applied to Web applications, Web content-delivery sites, and other content delivery systems.

Figure 3:
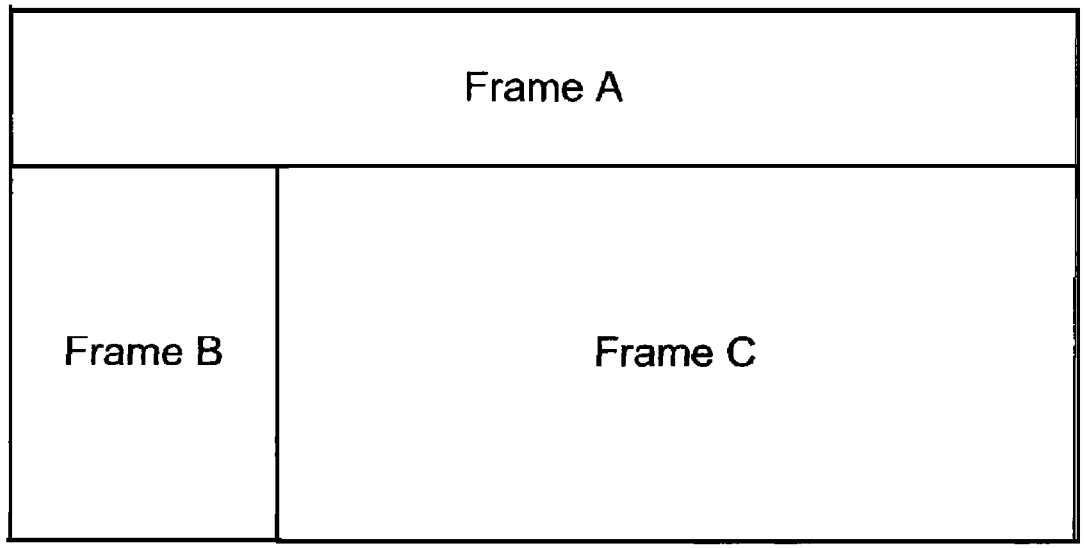
FIG. 3 is an illustration of a Web page with three frames.

Referring now to FIG. 4, it illustrates a flowchart of one method for replacing content in a multi-frame or multi-table Web page. This method could be used for replacing content in any partitioned or subdivided material. In this embodiment, the annotation server 105 can identify one of the frames or tables within a Web page and dynamically replace the content therein with new content. FIG. 3, for example, illustrates a Web page 135 with three frames: Frame A, Frame B, and Frame C. The annotation server 105 can identify Frame A, and dynamically replace the content therein with new content such as a virtual sales agent described in patent application Ser. No. 09/944,836, entitled System and Method for Automated End-User Support, filed Aug. 31, 2001. Similarly, the annotation server 105 could identify tables within a page that does not include frames and replace the content within that table. Additionally, the annotation server 105 could identify a table within a frame and replace content within that table.

To dynamically replace the content in a frame, the annotation server 105 initially identifies the frames in a Web page being viewed by the user. Step 140. The annotation server 105 then selects one frame for replacement. Step 145. Preferably, the selected frame is a secondary frame, e.g., a banner or index frame, and not the main frame that contains the primary information that the user is viewing. Once the frame has been selected, the annotation server 105 retrieves the replacement content, determines the size of the selected frame, and sizes the replacement content to fit in the selected frame. Step 150. The replacement content is then served to the user and displayed in the selected frame. Steps 160 and 165. The annotation server 105 then replaces the content of the selected frame with the replacement content. Step 155. The annotation server 105 does not necessarily alter the other frames. Notably, this method can also be adapted to modify tables.

From the user's perspective, all of the viewed content originates from the content provider 110. In reality, the replacement content originates from the annotation server 105 and the content in the other frames originates from the content provider 110. The annotation server 105, in this embodiment, can dynamically edit the material in the selected frame or table without otherwise involving the stored Web content 115. Thus, the annotation server 105 allows a content provider 110 to change significantly the user's browsing experience without requiring the content provider 110 to significantly modifying its stored Web content.

The annotation server's replacement of content can be conditional based upon a user's actions. For example, the replacement of content can be responsive to a user selecting a "HELP" button. Thus, the annotation server 105 can be engaged and disengaged based upon the user's actions. When the annotation server is disengaged, the Web server 120 can continue to operate normally because this embodiment of the annotation server 105 is not integrated into the Web server 120. In other words, the Web server 120 can be independent of the annotation server 105.

Referring now to FIG. 5, it is a flowchart of another method for modifying original content served up by a content provider 110 without substantially changing the content providing the stored Web content 115. This particular embodiment involves management of interstitials and pop-up windows. In particular, this embodiment suppresses pop-up windows and places the pop-up window content in a frame of the already displayed Web page. This suppression can prevent certain material from being covered by a pop-up window, i.e., moved to the background. This method, for example, is beneficial in online help situations where Frame A (shown in FIG. 3) includes a virtual agent that should not be covered by a pop-up window. Pop-up windows and interstitials are well known and documented in the art, and their implementation is not described herein.

In this embodiment, the user selects a Web page from the content provider 110. Step 170. This Web page is then provided from the content provider to the annotation server 105. Step 175. Alternately, the Web page may be cached at an alternate location, including the annotation server 105. Once the annotation server 105 receives the page, the annotation server 105 can determine if the page includes pop-up window instructions. Step 180. If the page includes such instructions, the annotation server 105 alters the instructions in the received page such that the pop-up instructions are suppressed, e.g., removed or edited. Step 185. The altered page is then provided to the user. Step 190. When the user selects a link within the page that was previously associated with a pop-up window, the content is rendered in the existing window. Step 195.

Referring now to FIG. 6, it is a flowchart of yet another method for modifying original content served up by a content provider 110 without substantially changing the content provider's stored Web content 115. This particular embodiment involves link, image, and icon insertion (collectively referred to as "objects"). As previously described, the annotation server 105 can replace embedded links in Web content with new or modified links. In one embodiment, the annotation server 105 can direct all or some portion of the embedded links within a Web page to its IP address instead of the content provider's IP address. Similarly, the annotation server 105 can insert text, images, or icons, which are associated with executable code, into a content provider's original content. For example, the annotation server 105 could insert a "SALE" icon next to all SONY™ TVs, and when the user selects the icon, embedded code can be executed that gives details of the sale. By using the annotation server 105, the content provider 110 does not need to modify its stored Web content 115 to reflect the "SALE" icon and the related code. The annotation server 105 stores the icon and code information and dynamically inserts it into the original content. Thus, the content provider 110 can make temporary or conditional changes to the appearance of its Web-site without otherwise changing its stored Web content 115.

Still referring to FIG. 6, the annotation server 105 intercepts original content that is directed to the user 125. Step 205. The annotation server 105 then determines which objects that it should search for in the original content Step 210. For example, the annotation server 105 could search a list of sale items and corresponding annotations that are designated by the retailer. Upon receiving original content from the particular retailer, the annotation server 105 would search the content for any of the sale items. The annotation server 105 could search for words, phrases, images, tables, links, etc. If a sale item is located, the appropriate object is inserted into the original content and that modified content is served to the user 125. Steps 215, 220 and 225. As with other embodiments, the user's browsing experience is significantly changed without requiring the content provider 110 to significantly change its stored Web content 115.

Navigation Control

Figure 7:
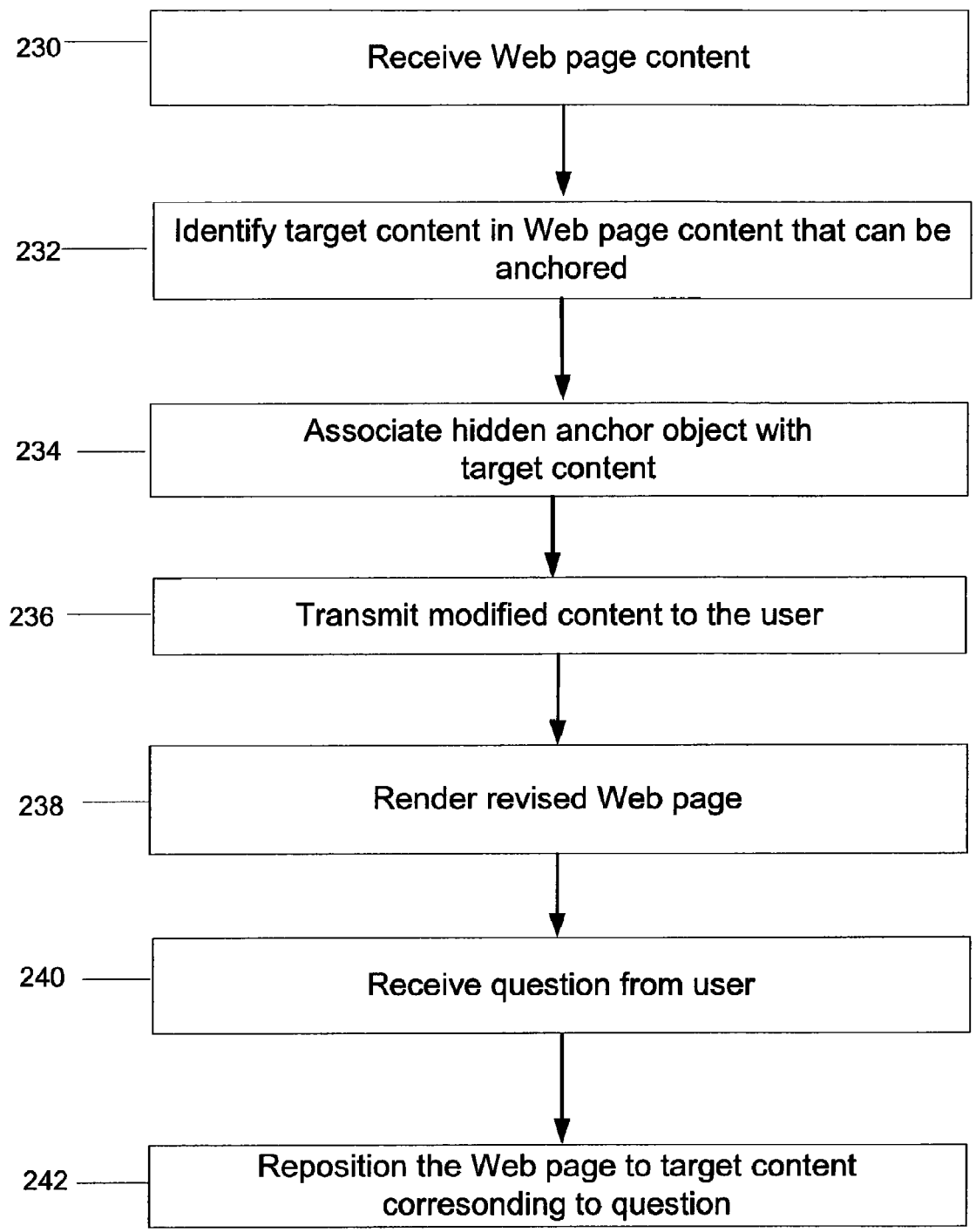
FIG. 7 is a flow chart of one method for automatically relocating a Web page.

FIG. 7 illustrates one method for controlling navigation in a Web-site. As with the above-described modification functionality, the control functionality can be implemented in the annotation server 105, thereby reducing or eliminating the need for stored Web content 115 to be modified. In this embodiment, the annotation server 105 can automatically scroll to or highlight material on a Web page. For example, assume that a user 125 is viewing a first Web page concerning a retailer's policies. The Web page may contain information regarding returns, warranties, returned checks, gift certificates, etc. The user 125, however, may only want to know the mailing address to which returns should be sent. If the user 125 poses this question to a virtual sales agent driven by the annotation server 105—possibly displayed in an accompanying frame—the annotation server 105 could locate the information in the Web page content and automatically scroll the page to the relevant material.

In one embodiment of the navigation control functionality, the annotation server 105 receives Web page content and identifies target content therein. Steps 230 and 232. The annotation server can then insert anchor objects, which may be hidden, into the received Web page content in association with the identified target content. Step 234. The modified Web page content can then be transmitted to the user for viewing. Steps 236 and 238. When the user selects an object within the page or submits a question, the appropriate anchor object can be located and the Web page can be repositioned accordingly. Steps 240 and 242. In other embodiments, the annotation server 105 can search the original content for relevant strings, such as "return address," and scroll the page to that point. Both embodiments can be implemented with a minimal amount of modification to the stored Web content 115.

In yet other embodiments, the annotation server 105 can determine that the page being viewed by the user 125 does not contain the requested information and automatically request another page from the content provider 110. In essence, the annotation server 105 is navigating the content provider's Web-site for the user 125. Although the content provider's stored Web content 115 is not necessarily modified, the content provider 110 should provide the annotation server 105 with a site map for the relevant portions of the stored Web content 115.

Event Monitoring

Figure 8:
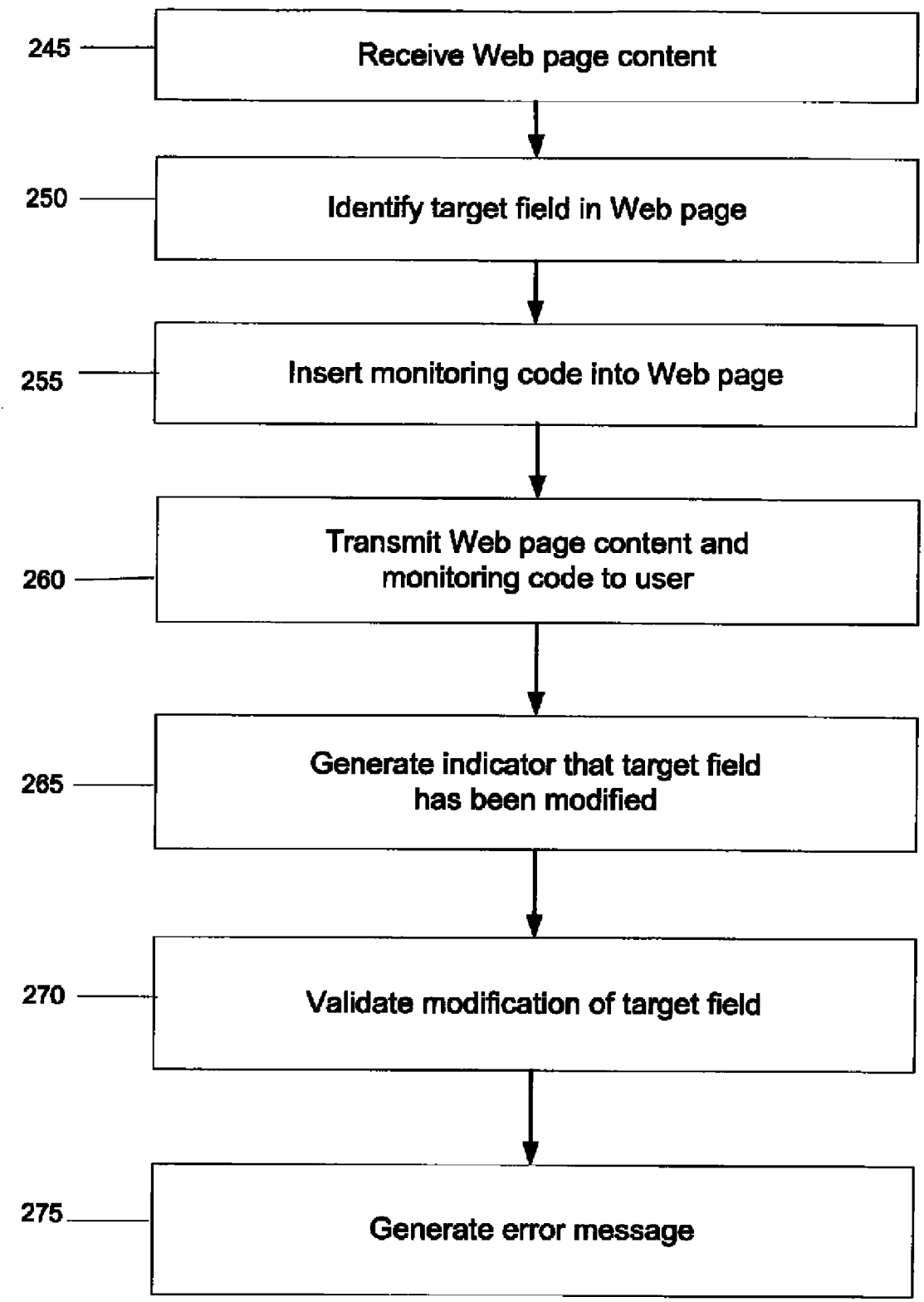
FIG. 8 is a flowchart of one method for validating an entry in an online form.

Referring now to FIG. 8, it is a flowchart of one method for monitoring a user's actions on a Web page, including form submits, navigation events, field submits, etc. This particular embodiment involves monitoring and validating fields in a Web-based form such as those commonly used by e-commerce sites and online travel reservation sites. Initially, the annotation server 105 intercepts the user-bound original content that includes the form being monitored. Step 245. The annotation server 105 identifies a target field then inserts executable code, such as JavaScript, into the original content. Steps 250 and 255. This executable code can validate the entries in the form without submitting the entries to the annotation server 105 or the content provider 110. The modified content is then served to the user 125 as if it originated from the content provider 110. Step 260.

The executable code that is inserted into the original content can monitor for the user 125 to enter data into the monitored field. Generally, the executable code can detect when the user 125 enters or exits the field. Step 265. Once the field has been exited, the executable code can validate the entry. Step 270. For example, the executable code may determine that an expiration date on a credit card has expired, that a required field was left blank, or that a particular flight destination is not available. Assuming that an entry is invalid, the embedded executable code can generate an error message and a recommendation, or the executable code can notify the annotation server 105, and the annotation server 105 can generate the error message and the recommendation. Step 275. In either embodiment, however, the error can be handled before the data is submitted to the content provider 110.

In other embodiments, the annotation server 105 detects when the user 125 submits a form to the content provider 110, and validates the form before it is actually submitted. For example, the user 125 could fill out an airline reservation request and submit it to the airline. The annotation server 105, however, could intercept the request and validate the information in the request by comparing it against information previously provided by the airline or by comparing it against logical rules such as a "departure date must be before a return date." If the data in the form is correct, then the form is passed to the airline for official processing. The annotation server 105 is not necessarily responsible for checking information such as flight availability, pricing, etc. Rather, the annotation server 105 generally—but not always—validates the form of the entries, not the substance.

When the annotation server 105 determines that the submitted data contains an error, the annotation server 105 can invoke a virtual sales agent, or it can generate an error message that directs the user 125 to the source of the error. For example, the annotation server 105 could scroll the viewed Web page to the incorrect entry and insert a text bubble indicating the type of error and the required information. From the user's perspective, the error message and assistance originates from the airline. In reality, the airline is unaware that the user 125 entered incorrect information because the annotation server 105 intercepted the incorrect information before it was submitted to the airline.

In conclusion, the present invention provides, among other things, a system and method for dynamically modifying and generating markup-language code. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for modifying a copy of original Web-page code stored at a content provider, the method comprising the steps of:
    responsive to a request from a user for Web content, receiving, at an annotation server, the copy of the original Web-page code, wherein the copy of the original Web-page code includes executable code associated with a data item:
    determining an operational modification that should be applied to the copy of the original Web-page code, wherein the determined operational modification is associated with the data item;
    modifying the copy of the original Web-page code according to the determined operational modification, wherein the original Web-page code stored at the content provider is not modified responsive to modifying the copy of the original Web-page code;
    providing the modified copy of original Web-page code to the user; and
    wherein the data item comprises a graphical object which comprises a graphics-based animation object which comprises Flash content.

2. A method for modifying a copy of original Web-page code stored at a content provider, the method comprising the steps of:
    responsive to a request from a user for Web content, receiving, at an annotation server, the copy of the original Web-page code, wherein the copy of the original Web-page code includes executable code associated with a data item:
    determining an operational modification that should be applied to the copy of the original Web-page code, wherein the determined operational modification is associated with the data item;
    modifying the copy of the original Web-page code according to the determined operational modification, wherein the original Web-page code stored at the content provider is not modified responsive to modifying the copy of the original Web-page code;
    providing the modified copy of original Web-page code to the user comprising:
    providing the modified copy of the original Web-page code from the annotation server directly to the user; and
    wherein modifying the copy of the original Web-page code comprises insertion of executable code configured to monitor for the user to enter data into a field.

3. A method for modifying original content received from a content provider, the method comprising the steps of:
    receiving the original content from the content provider, the original content including a content object;
    determining a modification that should be applied to the original content, wherein the determined modification is associated with the content object included in the received original content;
    modifying the received-original content according to the determined modification;
    providing the modified-original content to a user wherein the modified-original content, from the user's perspective, appears to originate from the content provider;
    wherein modifying the original content comprises inserting executable code into the original content which comprises inserting JavaScript into the original content.

4. The method of claim 3, wherein the original content comprises a field for user data entry and wherein the inserted executable code is configurable to validate the data entered into the field in a Web-based form against data previously provided by the content provider.

* * * * *